United States Patent [19]

Campbell

[11] 4,127,713

[45] Nov. 28, 1978

[54] AROMATIC SULFIDE/SULFONE POLYMER PRODUCTION

[75] Inventor: Robert W. Campbell, Bartlesville, Okla.

[73] Assignee: Phillips Petroleum Company, Bartlesville, Okla.

[21] Appl. No.: 851,329

[22] Filed: Nov. 14, 1977

[51] Int. Cl.$^2$ ............................................. C08G 75/20
[52] U.S. Cl. .................................... 528/391; 528/171; 528/388
[58] Field of Search .................. 260/79.3 M, 79.1, 79

[56] References Cited

U.S. PATENT DOCUMENTS 4,016,145   4/1977   Campbell ..................... 260/79.3 M Primary Examiner—Melvyn I. Marquis

[57] ABSTRACT

Aromatic sulfide/sulfone polymers of increased molecular weight are produced by contacting at least one dihalo aromatic sulfone, at least one alkali metal sulfide, at least one organic amide, at least one sodium carboxylate, and a sufficient amount of water to produce higher molecular weight polymers than are normally produced. The resulting polymers have utility as coatings, films, molded objects, filaments, fibers, and the like.

7 Claims, No Drawings

AROMATIC SULFIDE/SULFONE POLYMER PRODUCTION

This invention relates to the production of polymers from aromatic compounds. In accordance with another aspect, this invention relates to a process for the production of aromatic sulfide/sulfone polymers of increased molecular weight by contacting a dihalo aromatic sulfone, a selected alkali metal sulfide, an organic amide, a sodium carboxylate, and a sufficient amount of water including water of hydration to produce a polymer having a higher molecular weight than is normally obtained. In accordance with a further aspect, this invention relates to the production of p-phenylene sulfide/sulfone polymers of increased molecular weight by contacting a bis(p-halophenyl) sulfone, a selected alkali metal sulfide, an organic amide, sodium carboxylate, and at least 3.5 moles of water per mole of alkali metal sulfide under polymerization conditions including an elevated temperature and a period of time sufficient to form an aromatic sulfide/sulfone polymer of increased molecular weight.

In recent years, a wide variety of high polymers have been prepared, many of which are currently being produced and marketed on a large scale. While such polymers are useful in many areas, one property of high polymers, particularly those of the thermoplastic type, which needs to be improved is the ability to withstand high temperature. Since thermoplastic materials can be molded rapidly and efficiently into almost any desired shape, they lend themselves to mass production. The high polymer, especially a thermoplastic material, which would stand very high temperatures and could be used in such areas as electrical components, wire coatings, automotive parts, and the like has been the objective of a great deal of research.

This invention provides a novel process for the production of aromatic sulfide/sulfone polymers of high molecular weight. Such polymers are more desirable as molding resins than are aromatic sulfide/sulfone polymers of lower molecular weight since properties of the product molded from the polymer of higher molecular weight are superior.

Accordingly, an object of this invention is to produce aromatic sulfide/sulfone polymers exhibiting higher molecular weight than normally are obtained.

Another object of this invention is to provide a process for producing high molecular weight aromatic sulfide/sulfone polymers exhibiting good melt processing properties.

Other objects, aspects, and the several advantages of this invention will be apparent on a study of this disclosure and the appended claims.

In accordance with this invention, aromatic sulfide/sulfone polymers exhibiting higher molecular weight than normally obtained are produced by contacting at least one dihalo aromatic sulfone, at least one alkali metal sulfide other than lithium sulfide, at least one organic amide, at least one sodium carboxylate, and water including water of hydration in an amount of at least 3.5 moles per mole of alkali metal sulfide under polymerization conditions for a period of time sufficient to form an aromatic sulfide/sulfone polymer.

In accordance with one specific embodiment of the present invention, at least one dihalo aromatic sulfone such as a bis(p-halophenyl) sulfone, at least one alkali metal sulfide other than lithium sulfide, at least one organic amide such as N-methyl-2-pyrrolidone, at least one sodium carboxylate such as sodium acetate, and water including water of hydration in an amount within the range of about 3.5 to about 30 moles, preferably within the range of about 4 to about 20 moles, per mole of alkali metal sulfide employed are contacted under polymerization conditions including a temperature and for a period of time sufficient to form an aromatic sulfide/sulfone polymer exhibiting higher molecular weight than normally obtained.

Use of water within one or more of the ranges described results in polymers of higher molecular weight, as evidenced by higher inherent viscosity, than that of polymers which are produced when lesser amounts of water are employed under otherwise comparable conditions. This beneficial effect of water in obtaining polymer of high molecular weight is surprising in view of the detrimental effect of such an amount of water when a lithium carboxylate instead of a sodium carboxylate is employed in the production of an aromatic sulfide/sulfone polymer. Additionally, when the organic amide is used in optimum amount, the use of water in accordance with this invention as set forth above, instead of in a lesser amount such as 2.8 moles per mole of alkali metal sulfide employed, results in a reaction mixture which, instead of being in the form of an apparently dry powder, is in the form of a moist powder, moist granules, or slurry of granules, depending on the amount of water used, thereby making possible filtration of the reaction mixture. Furthermore, when in the form of a slurry, the reaction mixture is easier to transfer for processing.

In the present invention, at least one dihalo aromatic sulfone, at least one alkali metal sulfide other than lithium sulfide, at least one organic amide, at least one sodium carboxylate, and at least about 3.5 moles of water per mole of alkali metal sulfide are contacted under polymerization conditions including an elevated temperature, a period of time, and proportions of reactants sufficient to cause the reactants to react with each other and form an aromatic sulfide/sulfone polymer exhibiting higher molecular weight than normally obtained.

Dihalo aromatic sulfones that can be employed in the process of this invention can be represented by the formula:

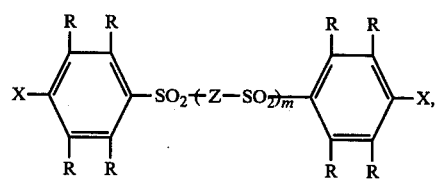

where each X is selected from the group consisting of fluorine, chlorine, bromine, and iodine; Z is a divalent radical selected from the group consisting of

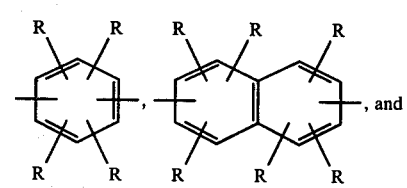

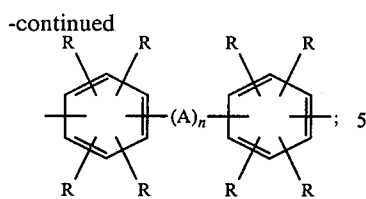

$m$ is 0 or 1; $n$ is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, $m$ is 0.

Examples of some dihalo aromatic sulfones that can be employed in the process of this invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)-benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis[p-(p-bromophenylsulfonyl)-phenyl]methane, 5,5-bis[3-ethyl-4-(p-chlorophenylsulfonyl)phenyl]nonane, and the like, and mixtures thereof.

As indicated above, alkali metal sulfides that can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. Preferably, the alkali metal sulfide is employed in hydrated form.

The organic amides that can be used in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

Sodium carboxylates which can be employed in the process of this invention can be represented by the formula $R'CO_2Na$, where R' is a hydrocarbyl radical selected from alkyl, cycloalkyl, and aryl, and combinations thereof, such as alkaryl, aralkyl, and the like, and the number of carbon atoms in R' is within the range of 1 to about 20. If desired, the sodium carboxylate can be employed as a hydrate or as a solution or dispersion in water.

Examples of some sodium carboxylates which can be employed in the process of this invention include sodium acetate, sodium propionate, sodium 2-methylpropionate, sodium butyrate, sodium valerate, sodium hexanoate, sodium heptanoate, sodium 2-methyloctanoate, sodium dodecanoate, sodium 4-ethyltetradecanoate, sodium octadecanoate, sodium heneicosanoate, sodium cyclohexanecarboxylate, sodium cyclododecanecarboxylate, sodium 3-methylcyclopentanecarboxylate, sodium cyclohexylacetate, sodium benzoate, sodium m-toluate, sodium phenylacetate, sodium 4-phenylcyclohexanecarboxylate, sodium p-tolylacetate, sodium 4-ethylcyclohexylacetate, and the like, and mixtures thereof.

As indicated above, the water can be employed as such, and/or it can be added as a hydrate of, and/or as a medium for, the alkali metal sulfide and/or the sodium carboxylate. The amount of water used should be at least about 3.5 moles of water per mole of alkali metal sulfide, and generally the amount of water used will range from about 3.5 to about 30 moles, preferably within the range of about 4 to about 20 moles, per mole of alkali metal sulfide employed.

The aromatic sulfide/sulfone polymers produced by the process of this invention can be characterized as having recurring

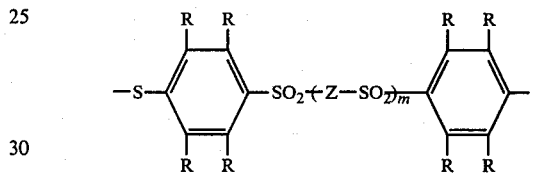

units, where each R, Z, and $m$ is as defined above.

Although the mole ratio of dihalo aromatic sulfone to alkali metal sulfide can vary over a considerable range, generally it will be within the range of about 0.9:1 to about 2:1, preferably about 0.95:1 to about 1.2:1. The mole ratio of sodium carboxylate to alkali metal sulfide can vary over a wide range but generally will be within the range of about 0.05:1 to about 4:1, preferably about 0.1:1 to about 2:1. Although the mole ratio of organic amide to alkali metal sulfide can vary greatly, generally it will be within the range of about 1:1 to about 25:1, preferably about 2:1 to about 8:1. The order of addition of the ingredients is not critical.

Although the reaction temperature at which the polymerization is conducted can vary over a considerable range, generally it will be within the range of about 170° C. to about 240° C., preferably about 180° C. to about 220° C. The reaction time can vary widely, depending in part on the reaction temperature, but generally will be within the range of about 10 minutes to about 3 days, preferably about 1 hour to about 8 hours. The pressure should be sufficient to maintain the dihalo aromatic sulfone, the organic amide, and the water substantially in the liquid phase.

The aromatic sulfide/sulfone polymers produced by the process of this invention can be separated from the reaction mixture by conventional procedures, e.g., by filtration of the polymer, followed by washing with water, or by dilution of the reactin mixture with water, followed by filtration and water washing of the polymer. If desired, at least a portion of the washing with water can be conducted at an elevated temperature, e.g., up to about 250° C. Water-miscible solvents such as acetone or methanol can be used to assist in the washing with water, if desired.

The aromatic sulfide/sulfone polymers produced by the process of this invention can be blended with fillers, pigments, extenders, other polymers, and the like. They can be cured through crosslinking and/or chain extension, e.g., by heating at temperatures up to about 480° C. in the presence of a free oxygencontaining gas, to provide cured products having high thermal stability and good chemical resistance. They are useful in the production of coatings, films, molded objects, and fibers.

Runs 7 and 8 in Table I are runs outside the scope of this invention which demonstrate that when lithium acetate instead of sodium acetate is employed, the presence of additional water results in a decrease, instead of an increase, in the inherent viscosity of the polymer produced.

In each of the runs in Table I, the yield of polymer was greater than 90 percent of the theoretical value.

TABLE I

| Run | Alkali Metal Acetate Used | Water Used, Moles per Mole Sodium Sulfide[a] | Character of Reaction Product[b] | Poly(p-phenylene Sulfide/Sulfone) Inherent Viscosity | Yield, % of Theoretical |
|---|---|---|---|---|---|
| 1 | NaOAc | 2.8 | Dry powder | 0.30 | 94 |
| 2 | NaOAc | 2.8 | Dry powder | 0.36 | 94 |
| 3 | NaOAc | 3.8 | Moist, grainy powder | 0.42 | 91 |
| 4 | NaOAc | 5.8 | Moist granules | 0.51 | 93 |
| 5 | NaOAc | 7.8 | Slurry of granules | 0.49 | 94 |
| 6 | NaOAc | 12.8 | Slurry of granules | 0.50 | 99 |
| 7 | LiOAc | 2.8 | Dry powder | 0.42 | 98 |
| 8 | LiOAc[c] | 4.8[d] | Moist powder | 0.36 | 97 |

[a]Includes the water of hydration in the hydrated sodium sulfide.
[b]Before washing.
[c]Used as the dihydrate.
[d]Includes the water of hydration in the lithium acetate dihydrate.

EXAMPLES

In each in a series of runs, 0.5 mole hydrated sodium sulfide (Na$_2$S.2.8H$_2$O), 0.2–0.5 g sodium hydroxide (to react with sodium bisulfide and sodium thiosulfate present in trace amounts in the sodium sulfide), 0.5 mole of anhydrous alkali metal acetate, water in varying amounts, 2.0 moles N-methyl-2-pyrrolidone, and 0.5 mole bis(p-chlorophenyl) sulfone were charged to a 1-liter autoclave equipped with stirrer, after which the autoclave was flushed with nitrogen. In each run, the resulting mixture was heated for 5 hours at 200° C. at autogenous pressure, the pressure in each instance being within the range of 60–175 psig. The reaction product from each run was washed repeatedly with hot water, the washing with hot water being interrupted by two washings with hot acetone in those runs in which sodium acetate was employed. The washed product from each run was dried at 80° C. in a vacuum oven. This dried product was poly(p-phenylene sulfide/sulfone), an aromatic sulfide/sulfone polymer having recurring

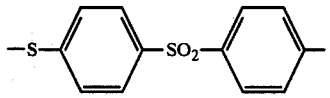

units in the polymer molecule. The inherent viscosity of the dried product was determined at 30° C. in a 3:2 mixture, by weight, of phenol and 1,1,2,2-tetrachloroethane at a polymer concentration of 0.5 g/100 ml solution. The runs are summarized in Table I.

As shown in Table I, Runs 3, 4, 5, and 6, each conducted in accordance with the process of this invention, provided poly(p-phenylene sulfide/sulfone) of higher molecular weight, based on inherent viscosity, than did Runs 1 and 2, outside the scope of this invention, in which less water was employed. Additionally, the reaction mixture product obtained in Runs 3–6 was in the physical form of a moist powder, moist granules, or a slurry of granules, depending on the amount of water used, in contrast with the dry powder obtained in Runs 1 and 2.

I claim:
1. A process for the production of high molecular weight aromatic sulfide/sulfone polymers which comprises contacting
   (a) at least one dihalo aromatic sulfone,
   (b) at least one alkali metal sulfide selected from the group consisting of sodium sulfide, potassium sulfide, rubidium sulfide, and cesium sulfide,
   (c) at least one organic amide,
   (d) at least one sodium carboxylate, and
   (e) water, including water of hydration in an amount of at least about 3.5 moles per mole of alkali metal sulfide, under polymerization conditions for a period of time, and proportions of reactants sufficient to cause the reactants to react and form a high molecular weight aromatic sulfide/sulfone polymer.

2. A process according to claim 1 wherein (a) is represented by the formula

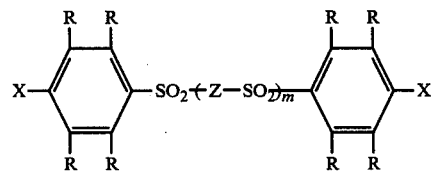

where each X is selected from the group consisting of fluorine, chlorine, bromine, and iodine; Z is a divalent radical selected from the group consisting of

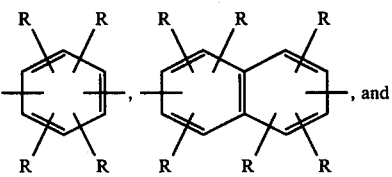

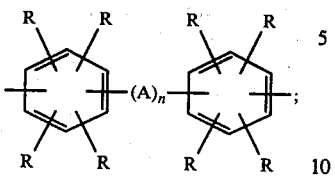

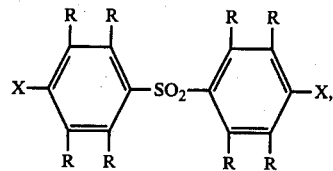

$m$ is 0 or 1; $n$ is 0 is 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12, (c) is a cyclic or acyclic amide having from 1 to about 10 carbon atoms per molecule, and (d) is represented by the formula $R'CO_2Na$, where $R'$ is a hydrocarbyl radical having from 1 to 20, inclusive, carbon atoms.

3. A process according to claim 2 wherein $m$ is 0 and (a) is represented by the formula where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12.

4. A process according to claim 1 wherein the temperature of the reaction is in the range of about 170° C. to about 240° C, the pressure is sufficient to maintain liquid phase conditions, the mole ratio of (a) to (b) is in the range of about 0.9:1 to about 2:1, the mole ratio of (d) to (b) ranges from about 0.05:1 to about 4:1, the mole ratio of (c) to (b) ranges from about 1:1 to about 25:1, and the amount of (e) present ranges from about 3.5 to about 30 moles per mole of (b).

5. A process according to claim 1 wherein p1 (a) is bis(p-chlorophenyl) sulfone,
(b) is hydrated sodium sulfide,
(c) is N-methyl-2-pyrrolidone, and
(d) is sodium acetate.

6. A process according to claim 1 wherein the amount of water present during said contacting is in the range of about 4 to about 20 moles per mole of alkali metal sulfide employed.

7. A process according to claim 6 wherein
(a) is bis(p-chlorophenyl) sulfone,
(b) is hydrated sodium sulfide,
(c) is N-methyl-2-pyrrolidone, and
(d) is sodium acetate.

* * * * *